United States Patent
Park (10) Patent No.: US 9,805,520 B2
(45) Date of Patent: Oct. 31, 2017

(54) METHOD AND SYSTEM FOR PROVIDING VEHICLE SECURITY SERVICE (71) Applicant: HYUNDAI MOTOR COMPANY, Seoul (KR)

(72) Inventor: Soon Chul Park, Hwaseong-si (KR)

(73) Assignee: HYUNDAI MOTOR COMPANY, Seoul (KR)

(*) Notice: Subject to any disclaimer, the term of this patent is extended or adjusted under 35 U.S.C. 154(b) by 87 days.

(21) Appl. No.: 14/600,937

(22) Filed: Jan. 20, 2015

(65) Prior Publication Data
US 2016/0110929 A1 Apr. 21, 2016

(30) Foreign Application Priority Data
Oct. 17, 2014 (KR) ........................ 10-2014-0140627

(51) Int. Cl.
H04W 76/02 (2009.01)
G07C 5/00 (2006.01)

(52) U.S. Cl.
CPC ............ G07C 5/008 (2013.01); H04W 76/02 (2013.01)

(58) Field of Classification Search
CPC ............................... G07C 5/008; H04W 76/02
See application file for complete search history.

(56) References Cited

U.S. PATENT DOCUMENTS

| 7,853,375 | B2 | 12/2010 | Tuff | |
|---|---|---|---|---|
| 2008/0140571 | A1* | 6/2008 | Inbarajan | G07C 5/008 705/51 |
| 2009/0112394 | A1* | 4/2009 | Lepejian | G07C 5/0808 701/29.5 |

(Continued)

FOREIGN PATENT DOCUMENTS

| JP | 2004-192277 A | 7/2004 |
|---|---|---|
| JP | 3178675 U | 9/2012 |

(Continued)

OTHER PUBLICATIONS

NPL-Pulling codes on your Corvette without a code reader-http://www.neilkline.com/Tech%20Tips/obdcodes.htm-, accessed Feb. 8, 2017, Waybackmachine.org Nov. 12, 2010.*

Primary Examiner — Truc M Do
Assistant Examiner — Jess Whittington
(74) Attorney, Agent, or Firm — McDermott Will & Emery LLP (57) ABSTRACT A vehicle security service provision method in a vehicle gateway to provide communication in a vehicle includes determining whether or not an external device has been connected, transmitting an external device connection-informing message to a vehicle telematics unit through the in-vehicle communication when it is determined that the external device has been connected, receiving an external device connection acceptance message from the vehicle telematics unit, and processing a diagnosis request message received from the external device in response to the received external device connection acceptance message. In accordance with the disclosed method, connection of an external device to the vehicle is sensed in real time. Sensed results are informed to a user terminal, for execution of a user approval procedure. Accordingly, an effective vehicle security service can be provided.

14 Claims, 4 Drawing Sheets (56) References Cited

U.S. PATENT DOCUMENTS

| | | | | |
|---|---|---|---|---|
| 2011/0112717 A1* | 5/2011 | Resner | ............... | G07C 5/008 701/31.4 |
| 2013/0198517 A1* | 8/2013 | Mazzarella | ......... | H04L 63/0428 713/168 |
| 2013/0268156 A1* | 10/2013 | Schumann | ............. | G07C 5/085 701/31.4 |
| 2014/0095014 A1* | 4/2014 | Rude | ..................... | G07C 5/008 701/31.4 |
| 2014/0107891 A1* | 4/2014 | Choi | ................. | H04M 1/6083 701/36 |
| 2014/0207629 A1* | 7/2014 | Bradley | ................. | B60R 25/00 705/28 |

FOREIGN PATENT DOCUMENTS

| | | |
|---|---|---|
| KR | 10-0931810 B1 | 12/2009 |
| KR | 10-2010-0021832 A | 2/2010 |
| KR | 10-2013-0025288 A | 3/2013 |
| KR | 10-1303735 B1 | 9/2013 |
| KR | 10-2013-0110714 A | 10/2013 |

\* cited by examiner

METHOD AND SYSTEM FOR PROVIDING VEHICLE SECURITY SERVICE

This application claims the benefit of the Korean Patent Application No. 10-2014-0140627, filed on Oct. 17, 2014, which is hereby incorporated by reference as if fully set forth herein.

BACKGROUND OF THE INVENTION

Field of the Invention

The present disclosure generally relates to a method and system for providing a vehicle security service, and more particularly to a vehicle security service provision method and system, which are capable of informing a designated mobile terminal of connection of an external device when connection of the external device is sensed through an in-vehicle on-board diagnostics (OBD) terminal, and allowing connection of the external device when connection of the external device is accepted by the mobile terminal.

Discussion of the Related Art

In accordance with development of vehicle technologies, vehicles recently placed on the market are provided with more diverse and complex measurement and sensing functions. Such measurement and sensing functions are controlled by electronic control units (ECUs) equipped in a vehicle.

Such a vehicle is also provided with a standardized interface, to which a vehicle diagnostic device, namely, an on-board diagnostics (OBD), is connectable, that is, an OBD connector. When the OBD is connected to the vehicle, information measured and sensed by various ECUs, for example, vehicle information, travel records, exhaust gas information, and error information, is sent to the OBD.

In particular, to satisfy continued demand for luxury vehicles, and safety and convenience of consumers, an increased number of ECUs are equipped in vehicles. For this reason, when ECUs associated with vehicle safety and security are hacked, fatal affects on user safety may be generated.

Generally, a high-speed controller area network is used as a communication line for controlling ECUs equipped in a vehicle. Hereinafter, the high-speed controller area network will be simply referred to as a "high-speed CAN". The high-speed CAN has an architecture in which plural ECUs are connected to a main bus via branches.

In vehicles recently placed on the market, various services are provided through communication with a mobile appliance such as a smartphone. For example, a handsfree voice communication service is provided. For such services, personal information of a driver may be stored in a vehicle head unit or the like. For this reason, there may be a problem of leakage of personal information through hacking by an external device.

Recently, leakage of vehicle information through hacking by an external device connected to an OBD terminal in a vehicle without permission has frequently occurred.

SUMMARY OF THE INVENTION

Accordingly, the present disclosure is directed to a method and system for providing a vehicle security service that substantially obviate one or more problems due to limitations and disadvantages of the related art.

An object of the present invention is to provide a method and system for providing a vehicle security service, which are capable of informing a user's mobile terminal of connection of an external device to an in-vehicle on-board diagnostics (OBD) terminal in real time when the connection is sensed, and allowing diagnosis through the external device when connection of the external device is accepted in accordance with user approval through the mobile terminal.

Another object of the present invention is to provide a method and system for providing a vehicle security service, which are capable of monitoring control signals received by and transmitted from a high-speed controller area network (CAN) in real time, to check whether or not an external device is connected, and informing a user of results of the checking.

Another object of the present invention is to provide a method and system for providing a vehicle security service, which are capable of remotely checking in real time whether or not a vehicle is hacked.

Another object of the present invention is to provide a method and system for providing a vehicle security service, which are capable of sensing current variation of an OBD connection terminal by a vehicle gateway, and transmitting results of the sensing to a designated user terminal when it is determined that an external device has been connected to the OBD connection terminal.

Additional advantages, objects, and features of the embodiments will be set forth in part in the description which follows and in part will become apparent to those having ordinary skill in the art upon examination of the following or may be learned from practice of the embodiments. The objectives and other advantages of the embodiments may be realized and attained by the structure particularly pointed out in the written description and claims hereof as well as the appended drawings.

To achieve these objects and other advantages and in accordance with the purpose of the embodiments, as embodied and broadly described herein, a vehicle security service provision method in a vehicle gateway to provide communication in a vehicle includes determining whether or not an external device has been connected, transmitting an external device connection-informing message to a vehicle telematics unit through the in-vehicle communication when it is determined that the external device has been connected, receiving an external device connection acceptance message from the vehicle telematics unit, and processing a diagnosis request message received from the external device in response to the received external device connection acceptance message.

The checking whether or not the external device has been connected may include sensing a voltage variation on an OBD connector connected to the vehicle gateway.

It may be determined that the external device has been connected, based on a voltage variation on an input port of the vehicle gateway under a condition that an eighth pin of the OBD connector is connected to the input port of the vehicle gateway.

When sixteenth and eighth pins provided at a connection terminal of the external device are shorted, the external device may be connected to the vehicle gateway via the OBD connector.

The voltage variation on the input port may be sensed when power is supplied to a sixteenth pin of the OBD connector such that the power supplied to the sixteenth pin is transferred to the eighth pin of the OBD connector in accordance with the short circuit.

The external device connection-informing message may be transferred to a designated user terminal by the vehicle telematics unit.

The external device connection acceptance message may be created by the user terminal, and may be transferred to the vehicle gateway via the vehicle telematics unit.

The vehicle security service provision method may further include receiving an external device connection rejection message from the vehicle telematics unit, and discarding the diagnosis request message received from the external device in response to the external device connection rejection message.

The vehicle security service provision method may further include receiving a security setting request signal from the vehicle telematics unit, and executing the checking whether or not the external device has been connected, in response to the security setting request signal.

The security setting request signal may be generated in accordance with at least one of inputting of a predetermined button provided at a handle of the vehicle, inputting of a predetermined button provided at one side of a room mirror in the vehicle, selection of a predetermined menu on a display screen of the vehicle telematics unit, and selection of a predetermined menu on a display screen of a designated user terminal.

When the diagnosis request message is received through an OBD connector, it may be determined that the external device has been connected, and a control operation to prevent routing of the diagnosis request message is executed until the external device connection acceptance message is received.

In another aspect of the present invention, a vehicle security service provision method in a vehicle telematics unit linked with a vehicle gateway through a communication network in a vehicle includes receiving an external device connection-informing message from the vehicle gateway, transferring the external device connection-informing message to a designated user terminal through a wireless network, receiving an external appliance connection acceptance message from the user terminal through the wireless network, and transferring the received external device connection acceptance message to the vehicle gateway.

The vehicle security service provision method may further include determining whether or not there is a driver in the vehicle, in response to the received external device connection-informing message, and displaying a predetermined informing message to inform that the external device has been connected, through a display screen provided at the vehicle, when it is determined that there is a driver in the vehicle.

The determining whether or not there is a driver in the vehicle may include determining whether or not a smart key of the driver has been sensed.

The determining whether or not there is a driver in the vehicle may include determining whether or not a terminal of the driver has been paired to the vehicle.

The vehicle security service provision method may further include receiving a security mode setting request signal from the user terminal before reception of the external device connection-informing message, and transferring the received security mode setting request signal to the vehicle gateway before reception of the external device connection-informing message.

The security mode may be set and released through inputting a predetermined button provided at at least one of a steering wheel of the vehicle and a room mirror of the vehicle.

In another aspect of the present invention, there is provided a computer-readable recording medium recorded with a program to execute any one of the above-described vehicle security service provision methods.

In another aspect of the present invention, a vehicle gateway for providing a vehicle security service in connection with a vehicle telematics unit includes a unit for checking whether or not an external device has been connected, a unit for transmitting an external device connection-informing message to the vehicle telematics unit through communication in a vehicle when it is determined that the external device has been connected, a unit for receiving an external device connection acceptance message from the vehicle telematics unit, and a unit for processing a diagnosis request message received from the external device in response to the received external device connection acceptance message.

The vehicle gateway may be connected to an on-board diagnostics (OBD) connector for connection of the external device, and senses a voltage variation on the OBD connector, to check whether or not the external device has been connected.

It may be determined that the external device has been connected, based on a voltage variation on an input port of the vehicle gateway under a condition that an eighth pin of the OBD connector is connected to the input port of the vehicle gateway.

When sixteenth and eighth pins provided at a connection terminal of the external device are shorted, the external device may be connected to the vehicle gateway via the OBD connector.

The voltage variation on the input port may be sensed when power is supplied to a sixteenth pin of the OBD connector such that the power supplied to the sixteenth pin is transferred to the eighth pin of the OBD connector in accordance with the short circuit.

The vehicle gateway may further include a unit for receiving an external device connection rejection message from the vehicle telematics unit, and discarding the diagnosis request message received from the external device in response to the external device connection rejection message.

The vehicle gateway may further include a unit for receiving a security setting request signal from the vehicle telematics unit. In this case, the external device connection checking unit may check whether or not an external device has been connected, in response to the security setting request signal.

The vehicle gateway may be connected to an OBD connector for connection of the external device and, when the diagnosis request message is received through the OBD connector, the vehicle gateway may determine that the external device has been connected, and may execute a control operation to prevent routing of the diagnosis request message until the external device connection acceptance message is received.

In another embodiment of the present invention, a vehicle telematics unit for providing a vehicle security service in connection with a vehicle gateway through a communication network in a vehicle includes a unit for receiving an external device connection-informing message from the vehicle gateway, a unit for transferring the external device connection-informing message to a designated user terminal through a wireless network, a unit for receiving an external appliance connection acceptance message from the user terminal through the wireless network, and a unit for transferring the received external device connection acceptance message to the vehicle gateway.

In still another embodiment of the present invention, a system for providing a vehicle security service in connection with a wireless network includes a vehicle gateway for sensing whether or not an external device has been connected via an on-board diagnosis (OBD) connector, thereby creating an external device connection-informing message, and a vehicle telematics unit for transferring the external device connection-informing message to a designated user terminal through the wireless network upon receiving the external device connection-informing message from the vehicle gateway, receiving, from the user terminal, a message representing whether or not connection of the external device has been accepted, and transferring the received message to the vehicle gateway, wherein the vehicle gateway determines whether or not a diagnosis request message received via the OBD connector should be processed, based on the message representing whether or not connection of the external device has been accepted.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and along with the description serve to explain the principle of the invention. In the drawings.

DETAILED DESCRIPTION OF THE INVENTION

Hereinafter, apparatus and various methods, to which embodiments of the present invention are applicable, will be described in detail with reference to the annexed drawings. The suffixes "module" and "unit" of elements herein are used for convenience of description and thus can be used interchangeably and do not have any distinguishable meanings or functions.

Although all elements constituting the embodiments of the present invention are described so as to be integrated into a single one or to be operated as a single one, the present invention is not necessarily limited to such embodiments. According to embodiments, all of the elements may be selectively integrated into one or more and be operated as one or more within the object and the scope of the present invention. Each of the elements may be implemented as independent hardware. Alternatively, some or all of the elements may be selectively combined into a computer program having a program module performing some or all functions combined in one or more pieces of hardware. A plurality of codes and code segments constituting the computer program may be easily reasoned by those skilled in the art to which the present invention pertains. The computer program may be stored in a computer readable media such that the computer program is read and executed by a computer to implement embodiments of the present invention. Computer program storage media may include magnetic recording media, optical recording media, and carrier wave media.

The term "comprises", "includes", or "has" described herein should be interpreted not to exclude other elements but to further include such other elements since the corresponding elements may be inherent unless mentioned otherwise. All terms including technical or scientific terms have the same meanings as generally understood by a person having ordinary skill in the art to which the present invention pertains unless mentioned otherwise. Generally used terms, such as terms defined in a dictionary, should be interpreted to coincide with meanings of the related art from the context. Unless obviously defined in the present invention, such terms are not interpreted as ideal or excessively formal meanings.

It will be understood that, although the terms first, second, A, B, (a), (b), etc. may be used herein to describe various elements of the present invention, these terms are only used to distinguish one element from another element and essential, order, or sequence of corresponding elements are not limited by these terms. It will be understood that when one element is referred to as being "connected to", "coupled to", or "accessed by" another element, one element may be "connected to", "coupled to", or "accessed by" another element via a further element although one element may be directly connected to or directly accessed by another element.

Figure 1:
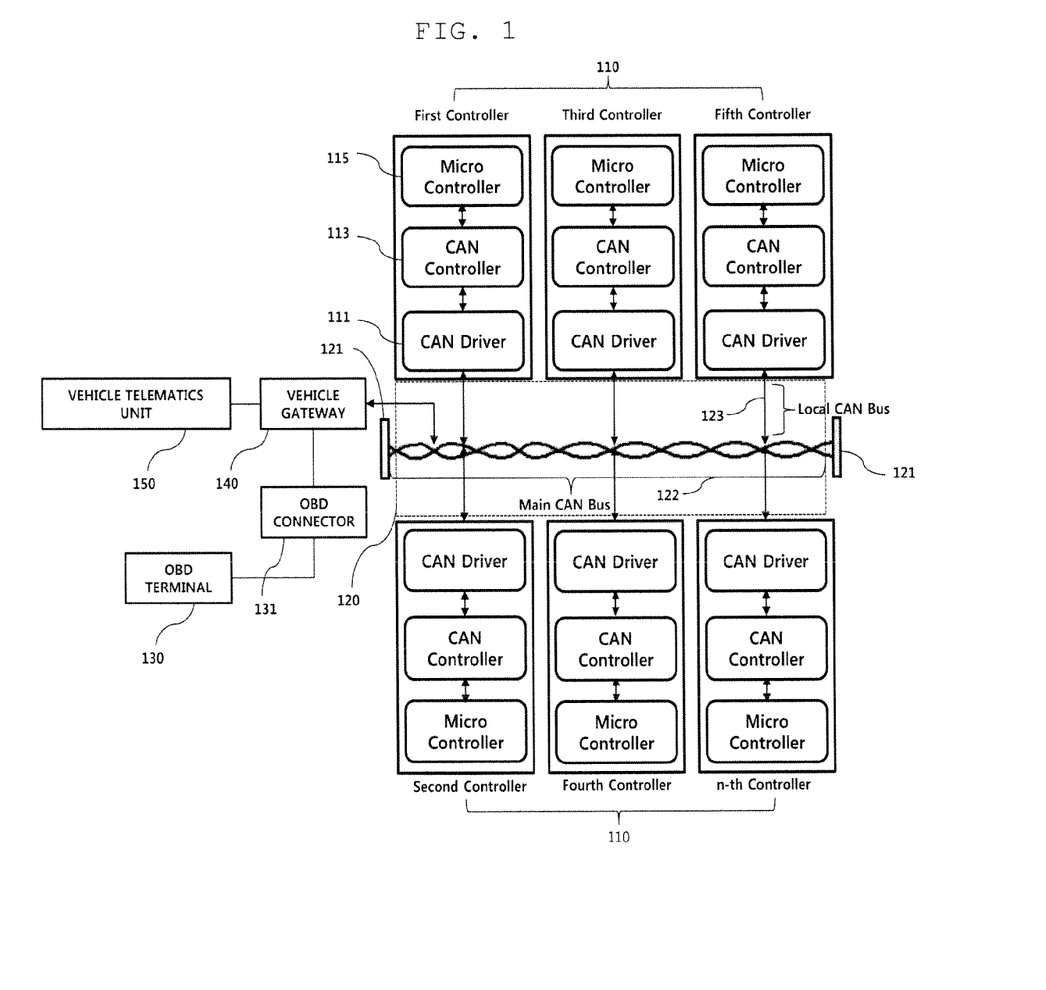
FIG. 1 is a block diagram illustrating an in-vehicle security service system for providing a vehicle security service in accordance with an embodiment of the present invention.

FIG. 1 is a block diagram illustrating an in-vehicle security service system for providing a vehicle security service in accordance with an embodiment of the present invention.

Referring to FIG. 1, a controller area network (CAN) communication system applicable to the present invention is illustrated. The CAN communication system may mainly include at lease one of first to n-th controllers 110, a CAN bus 120, an OBD terminal 130, an OBD connector 131, a vehicle gateway 140, and a vehicle telematics unit 150.

The vehicle gateway 140 may determine whether or not a selected one of the controllers 110 connected to a CAN is a secure controller, through authentication of the selected controller 110. The vehicle gateway 140 may also be connected to the vehicle telematics unit 150 and OBD terminal 130 in a wired or wireless manner. For example, the user may check state information of the controllers 110 connected to a main CAN bus 122 or may monitor various control signals transmitted or received via the main CAN bus 122, through a display screen of the OBD terminal 130, after connecting the OBD terminal 130 to the OBD connector 131. The user may also check, through the OBD terminal 130, vehicle state information collected by the controllers 110. The state information of the controllers 110, control signals on the main CAN bus 122, vehicle state information collected by the controllers 110, etc., may be transmitted to the OBD terminal 130 via the vehicle gateway 140.

In accordance with another embodiment of the present invention, the OBD connector 131 may be directly connected to the main CAN bus 122. In this case, the OBD terminal 130 may directly monitor transmitted and received signals on the main CAN bus 122 or may acquire controller state information or vehicle state information from the controllers 110 through certain control commands, without using the vehicle gateway 140.

In addition, the vehicle gateway 140 may collect version information of software installed in the controllers equipped in the vehicle, namely, the ECUs, and may transmit the collected software version information to the OBD terminal 130, in accordance with a certain control signal from the OBD terminal 130. In response to an update request signal for certain software from the OBD terminal 130, the vehicle gateway 140 may receive a software file for an associated one of the controllers from the OBD terminal 130, and may install the received software file in the associated controller.

The main CAN bus 122 uses twisted pair wire. Two wires of the twisted pair wire are driven by different signals CAN_HI and CAN_LO, respectively. The main CAN bus 122 may be provided with terminal resistors 121 at opposite terminals thereof, respectively. The transfer rate of the main CAN bus 122 may depend on a bus length, namely, the wire length of the main CAN bus 122.

The first to n-th controllers 110 may be connected to a CAN joint connector or a CAN hub (not shown) via local CAN buses 123. The maximum number of controllers connectable to one CAN is theoretically 2,032. A plurality of controllers may be connected to one CAN hub via local CAN buses 123.

Hereinafter, structures of controllers connected to a general main CAN bus will be described in conjunction with the controllers 110 to 115.

The controller 110 may include a CAN driver 111, a CAN controller 113, and a microcontroller 115.

The CAN driver 111 is connected to the main CAN bus 122 via one local CAN bus 123 and a CA connector or CAN hub (not shown), to form a physical layer of one controller. The CAN driver 111 may provide a function to sense failure of the main CAN bus 122 and to manage the main CAN bus 122 and a message transmission and reception function.

The CAN controller 113 performs a function to transmit and receive a CAN protocol message and a message filtering function for the received message. Alternatively, the CAN controller 113 provides a message buffering function for control of re-transmission and an interface function with respect to the microcontroller 115.

The microcontroller 115 may be equipped with a central processing unit (CPU). The microcontroller 115 may provide an upper layer protocol and various applications.

Although not shown in FIG. 1, the controller 110 may include a memory storing priority order information, version information of installed software, sensing information, etc.

Here, the memory may include at least one storage medium selected from a flash memory, a hard disk, a multimedia card micro type memory, a card type memory (for example, an SD memory or a XD memory), a random connection memory (RAM), a static random access memory (SRAM), a read-only memory (ROM), an electrically erasable programmable read-only memory (EEPROM), a programmable read-only memory (PROM), a magnetic memory, a magnetic disc, and an optical disc.

The vehicle gateway 140 senses a control signal on the main CAN bus 122 and, as such, may check whether or not an external device has been connected to the OBD connector 131. Here, the external device may be a wiretapping device or an unauthorized vehicle monitoring device.

For example, the control signal used to determine whether or not an external device has been connected may include a "07DF" command, which is identical to a control signal used by the OBD terminal 130 in a normal state.

In particular, when the vehicle gateway 140 receives a control signal, for example, a diagnosis request message for a selected ECU, from an external device connected to the OBD connector 131, the vehicle gateway 140 may transmit, to the vehicle telematics unit 150, an informing message to inform of connection of the external device, without transmitting the diagnosis request message to the associated controller. Then, the vehicle telematics unit 150 may transfer the received informing message to a telematics center server via a wireless network. The telematics center server may transmit, to a designated user terminal, a connection approval request message for user approval according to connection of the external device. For example, the user terminal may be a mobile terminal pre-registered by the driver of the associated vehicle.

Upon receiving the connection approval request message, the user terminal may configure a predetermined user interface screen, and may output the predetermined user interface screen to a display screen.

When connection is accepted by the user, the user terminal may create a predetermined connection acceptance message, and may then transmit the connection acceptance message to the telematics center server.

The telematics center server transfers the connection acceptance message to the vehicle telematics unit 150 via the wireless network. When the vehicle telematics unit 150 transfers the connection acceptance message to the vehicle gateway 140, the vehicle gateway 140 routes the received diagnosis request signal to the associated ECU via the OBD connector 131. Subsequently, the vehicle gateway 140 may receive a diagnosis response message including results of diagnosis from the associated ECU, and may then transmit the diagnosis response message to the external device connected to the OBD connector 131.

In accordance with another embodiment of the present invention, the vehicle telematics unit 150 may check whether there is a Bluetooth-paired user terminal, upon receiving from the vehicle gateway 140 a predetermined informing message representing connection of an external device to the OBD connector 131, namely, an external device connection-informing message.

When it is determined, based on checked results, that there is a Bluetooth-paired user terminal, the vehicle telematics unit 150 may transfer the external device connection-informing message to the user terminal through Bluetooth communication.

Upon receiving the external device connection-informing message, the user terminal may configure a predetermined user interface screen for approval of connection of the external device, and may display the user interface screen on a display screen. When connection of the external device is accepted in accordance with user input, the user terminal may transmit an external device connection acceptance message to the vehicle telematics unit 150 through Bluetooth communication. Then, the vehicle telematics unit 150 may transfer the external device connection acceptance message to the vehicle gateway 140. In accordance with a diagnosis request signal received from the external device, the vehicle gateway 140 may receive results of diagnosis from the associated ECU, and may then transmit the received diagnosis results to the external device.

In accordance with another embodiment of the present invention, the vehicle gateway 140 may check whether or not an external device has been connected, through sensing of current flow through the OBD connector 131. In detail, a pin such as a 12V pin of the OBD connector 131 is shorted to an I/O port connection pin provided at the vehicle gateway 140 and, as such, the vehicle gateway 140 may determine that an external device has been connected to the OBD connector 131, when variation of current input to the I/O port connection pin of the vehicle gateway 140 is equal to or higher than a predetermined threshold value.

The vehicle gateway 140 according to the present invention may monitor whether or not an external device has been connected to the OBD connector 131 under the condition that a security mode is set.

In this case, setting of the security mode may be achieved through setting of a desired menu on the vehicle telematics unit 150. In accordance with another embodiment of the present invention, the driver may set the security mode, using a control button provided at a vehicle handle (steering wheel) or one side of a room mirror. In accordance with another embodiment of the present invention, the driver may remotely transmit a security mode setting request signal to the vehicle telematics unit 150, using an application installed in a smartphone of the driver. In this case, the vehicle telematics unit 150 may transmit, to the vehicle gateway 140, the fact that setting of the security mode has been requested.

Of course, it should be noted that the security mode set by one of the above-described security mode setting means may be released.

Figure 2:
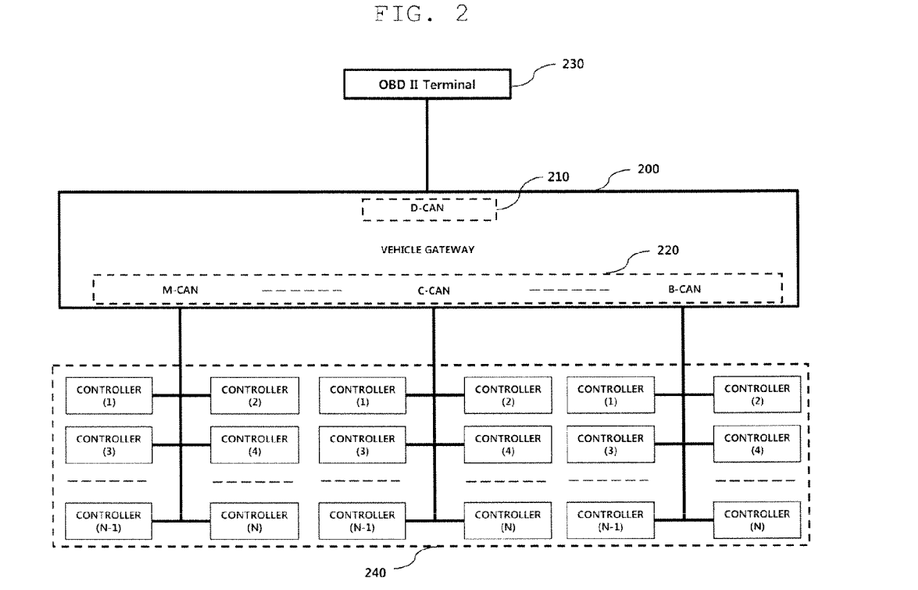
FIG. 2 is a block diagram explaining an in-vehicle communication network architecture according to another embodiment of the present invention.

FIG. 2 is a block diagram explaining an in-vehicle communication network architecture according to another embodiment of the present invention.

Referring to FIG. 2, a vehicle gateway 200 is illustrated. The vehicle gateway 200 may be mainly divided into a D-CAN 210 and internal CANs 220.

The D-CAN 210 may be connected to an OBD-II terminal 230. Each internal CAN 220 may be connected to associated controllers 240. A control signal received from an external device via the D-CAN 210 may be transferred to an associated internal CAN 220 by an internal logic of the vehicle gateway 200. In addition, results of diagnosis for a controller 240 received via the associated internal CAN 220 may be transmitted to the external device via the D-CAN 210 and OBD-II terminal 230 in accordance with the internal logic of the vehicle gateway 220.

As illustrated in FIG. 2, the internal CANs 220 may be grouped in accordance with applications and characteristics of the controllers connected thereto and, as such, may be divided into a C-CAN, a B-CAN, an M-CAN, a P-CAN, etc.

The C-CAN is a high-speed CAN network, and is the most common physical layer. High-speed CAN networks may be implemented with two wires, and may allow communication at transfer rates up to 1 megabit per second (Mbps). Another name for the C-CAN is ISO 11898-2. As an ECU connected to a typical high-speed CAN, there may be an anti-lock brake system (ABS), an engine control module, an emissions system, etc.

The B-CAN is a low-speed/fault-tolerant CAN physical layer. The B-CAN is implemented with two wires. The B-CAN communicates with an ECU at rates up to 125 kb/s. The B-CAN offers a transceiver having fault tolerance capabilities. The low-speed/fault-tolerant CAN physical layer is defined as ISO 11898-3. For example, low-speed/fault-tolerant devices applied to vehicles include a comfort device. Wires that have to pass through the door of a vehicle are low-speed/fault-tolerant in light of the stress that is inherent to opening and closing a door. In addition, in situations where an advanced level of security is desired, such as with brake lights, low-speed/fault-tolerant CAN offers a solution.

Meanwhile, the M-CAN is a low-speed CAN physical layer for controlling devices required for playback of multimedia. The M-CAN may be used for communication with the vehicle telematics unit of the present invention or the like.

The vehicle gateway 200 performs a function to route all messages generated on the in-vehicle communication network. Accordingly, the vehicle gateway 200 may monitor all messages transmitted and received in the vehicle. That is, the vehicle gateway 200 may identify transfer interval information, message identifier information, transmission terminal information, reception terminal information, etc. contained in messages.

In particular, upon receiving a diagnosis request message via the D-CAN 210, the vehicle gateway 200 according to an embodiment of the present invention checks whether or not the user has accepted connection of an external device. When it is determined that connection of an external device has been rejected, the vehicle gateway 200 may transmit a predetermined external device connection-informing message representing connection of an external device to a vehicle telematics unit via the internal CAN 220. Upon receiving an external device connection acceptance message from the vehicle telematics unit, the vehicle gateway 200 may allow connection of an external device and, as such, may process a diagnosis request message from the external device.

When no diagnosis request message is received from the external device, the vehicle gateway 200 may perform a control operation to prevent routing of a message to the OBD-II terminal 230.

Figure 3:
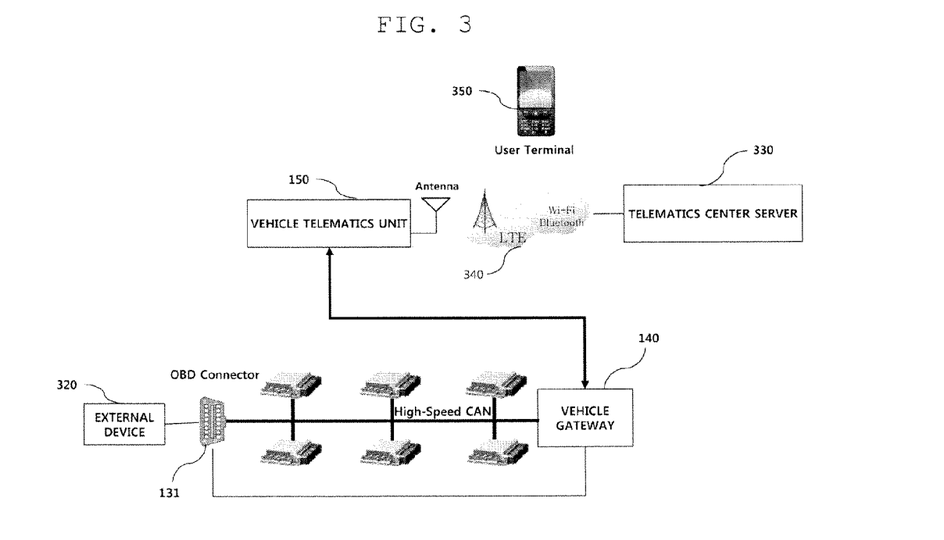
FIG. 3 is a system configuration diagram explaining a method for providing a vehicle security service in connection with a wireless network according to an embodiment of the present invention.

FIG. 3 is a system configuration diagram explaining a method for providing a vehicle security service in connection with a wireless network according to an embodiment of the present invention.

Referring to FIG. 3, the user may set a security mode through selection of a desired menu on the vehicle telematics unit 150.

In accordance with another embodiment of the present invention, the driver may request setting of a security mode for a network in his vehicle, using a predetermined application installed in a user terminal 350. In this case, a security mode setting request signal generated by the user terminal 350 is transmitted to the vehicle telematics unit 150 via a wireless network 340. Here, the wireless network 340 may include a wideband code division multiple connection (WCDMA) network, a long term evolution (LTE)/LTE-A network, a Wi-Fi network, etc.

Then, the vehicle telematics unit 150 transmits, to the vehicle gateway 140, a control signal informing that setting of a predetermined security mode has been requested.

When setting of the security mode has been requested, the vehicle gateway 140 may sense a control signal on a main CAN bus and, as such, may determine whether or not an external device 320 has been connected. Alternatively, the vehicle gateway 140 may determine that the external device 320 has been connected, when a control signal is received via the D-CAN 210.

When setting of the security mode has been requested, the vehicle gateway 140 may check consumed current on the OBD connector 131 and, as such, may determine whether or not the external device 320 has been connected.

When it is determined that the external device 320 has been connected to the OBD connector 131, the vehicle gateway 140 transmits, to the vehicle telematics unit 150, a predetermined informing message to inform of connection of the external device 320 to the OBD connector 131 (hereinafter, simply referred to as an "external device connection-informing message").

Upon receiving the external device connection-informing message, the vehicle telematics unit 150 checks whether or not the driver has gotten in the vehicle. When the driver has gotten in the vehicle, the vehicle telematics unit 150 may display, on a display screen thereof, a predetermined guide message to inform that the external device 320 has been connected to the OBD connector 131.

On the other hand, when it is not determined that the driver has gotten in the vehicle, the vehicle telematics unit 150 may transfer the external device connection-informing message to the telematics center server 330 via the wireless network.

The telematics center server 330 may create an external device connection-informing message to inform that an external device has been connected to a mobile device of the driver of the associated vehicle (hereinafter, simply referred to as a "user terminal 350"), and may transmit the created external device connection-informing message through the wireless network. For example, the external device connection-informing message may contain a string of characters "An external device has been connected to the OBD connection terminal of your vehicle. Do you wish to accept connection of the external device?".

Upon receiving the external device connection-informing message, the user terminal 350 may configure a predetermined user interface screen for checking whether or not the user has accepted connection of the external device, and may display the predetermined user interface screen. When the user has accepted connection of the external device, the user terminal 350 may transmit a predetermined control signal representing that the user has accepted connection of the external device (hereinafter, simply referred to as an "external device connection acceptance message") to the telematics center server 330 via the wireless network. Then, the telematics center server 330 may transfer the external device connection acceptance message to the vehicle telematics unit 150 via the wireless network. The vehicle telematics unit 150 may then transmit the external device connection acceptance message to the vehicle gateway 140 via the in-vehicle communication network.

When connection of an external device has been rejected by the user in the above-described example, the user terminal 350 may transmit a predetermined control signal representing that connection of an external device has been rejected (hereinafter, simply referred to as an "external device connection rejection message") to the vehicle gateway 140 via the telematics center server 330 and vehicle telematics unit 150. In this case, the vehicle gateway 140 may ignore and discard a diagnosis request signal received from the external device 320.

Figure 4:
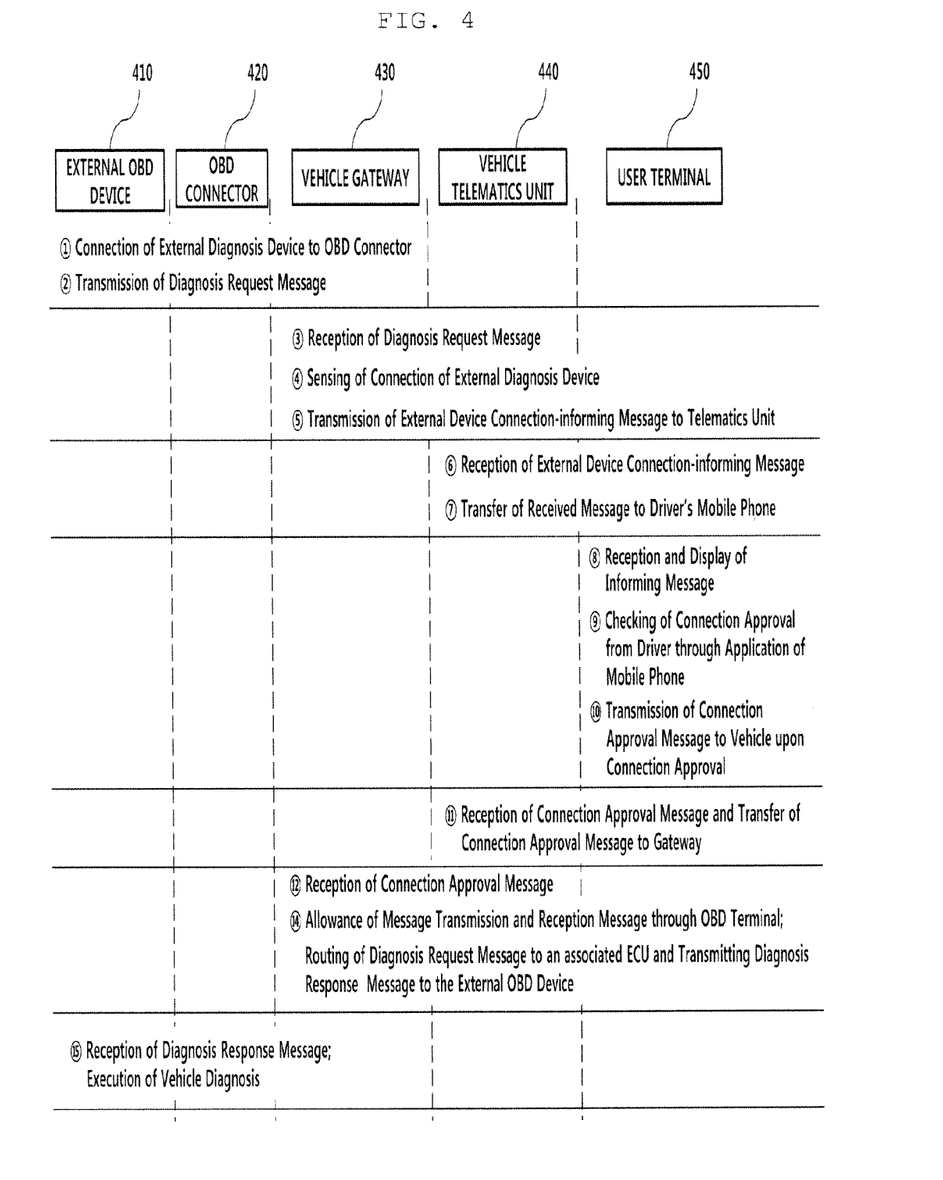
FIG. 4 is a flowchart explaining a vehicle security service provision procedure according to an embodiment of the present invention.

FIG. 4 is a flowchart explaining a vehicle security service provision procedure according to an embodiment of the present invention.

Referring to FIG. 4, when an external OBD device 410 is connected to an OBD connector 420, the external OBD device 410 transmits a diagnosis request message to a vehicle gateway 430 via the OBD connector 420 and a D-CAN 210.

Upon receiving the diagnosis request message via the D-CAN 210, the vehicle gateway 420 determines that the external OBD device 410 has been connected, and transmits an external device connection-informing message to a vehicle telematics unit 440 via an internal CAN 220 (ex. an M-CAN).

Upon receiving the external device connection-informing message, the vehicle telematics unit 440 transfers the external device connection-informing message to a designated user terminal 450. In this case, the external device connection-informing message may be transferred to the user terminal 450 via a telematics center server, or may be directly transmitted to the user terminal 450, using a near field connection communication means such as Bluetooth or Wi-Fi.

Upon receiving the external device connection-informing message, the user terminal 450 may configure a predetermined user interface screen including a predetermined guide character string informing that an external device has been connected to the vehicle, and selection buttons associated with user approval, and may display the user interface screen on a display screen. The selection buttons may include an acceptance button and a rejection button.

When user approval is input, the vehicle telematics unit 440 may receive an external device connection acceptance message from the user terminal 450, and may then transfer the external device connection acceptance message to the vehicle gateway 430 via the internal CAN (ex. the M-CAN).

Upon receiving the external device connection acceptance message, the vehicle gateway 430 allows message transmission and reception through the OBD connector 420. That is, the vehicle gateway 430 may transfer the diagnosis request message received from the external OBD device 410 to an associated ECU, and may transfer a diagnosis response message received from the associated ECU to the external OBD device 410.

Figure 5:
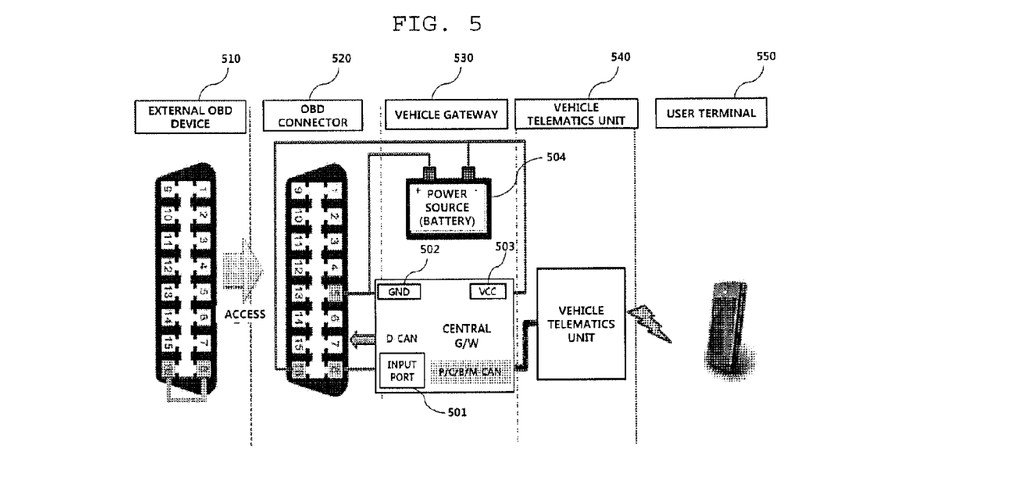
FIG. 5 is a diagram explaining a method for sensing connection of an external device by sensing current flow through an on-board diagnostics (OBD) connector in a vehicle gateway in accordance with an embodiment of the present invention.

FIG. 5 is a diagram explaining a method for sensing connection of an external device by sensing current flow through an OBD connector in a vehicle gateway in accordance with an embodiment of the present invention.

The OBD connector applied to this embodiment, namely, an OBD connector 520, may be an OBD-II connector. The OBD-II connector is of a type improved over the existing OBD connection terminals (rectangular shape). As illustrated in FIG. 5, the OBD-II connector has a trapezoidal shape.

Referring to FIG. 5, an eighth pin (I/O port connection pin) and a sixteenth pin (12V input pin) in the connection terminal of the external OBD connector should be shorted. If the eighth pin and sixteenth pin of the external OBD device 510 are in an open state, the external OBD device 510 cannot be connected to a vehicle gateway 530 via an OBD connector 520. In detail, a voltage of 12V is supplied to the sixteenth pin of the OBD connector 520. In accordance with the above-described shorted state, the 12V voltage supplied to the sixteenth pin of the OBD connector 520 is transferred to the eighth pin of the OBD connector 520.

The sixteenth pin of the OBD connector 520 is a positive (+) terminal of a vehicle power source 504, namely, a 12V voltage terminal, whereas a fifth pin of the OBD connector 520 is connected to a negative (−) terminal of the vehicle power source 504, namely, a signal GND terminal. In particular, the fifth and eighth pins of the OBD connector 520 are connected to a ground (GND) port 502 and an input port 501, which are included in the vehicle gateway 530.

The positive (+) terminal of the vehicle power source 504, namely, the 12V voltage terminal, may be connected to a VCC port 503 of the vehicle gateway 530 and, as such, power required for operation of the vehicle gateway 530 may be supplied. Here, the eighth pin of the OBD connector 520 may be a pin, application of which is not defined by current international standards. That is, the eighth pin of the OBD connector 520 may be a reserved pin defined for later use. In this regard, in accordance with the present invention, the eighth pin of the OBD connector 520 is configured to be connected to the input port 501 of the vehicle gateway 530 and, as such, it may be possible to sense connection of the external OBD appliance 510, based on voltage variation through the input port 501.

When the connection terminal of the external OBD device 510 is connected to the OBD connector in the above-described manner, the vehicle gateway 530 may sense a 12V voltage through the input port 501. In this case, the vehicle gateway 530 determines that the external OBD device 510 has been connected to the OBD connector 520, and then transmits an external device connection-informing message to the vehicle telematics unit 540 via an M-CAN. Then, the vehicle telematics unit 540 transfers the received external device connection-informing message through a wireless network. Upon subsequently receiving an external device connection acceptance (or rejection) message from the user terminal 550, the vehicle telematics unit 540 transfers the received message to the vehicle gateway 530.

Figure 6:
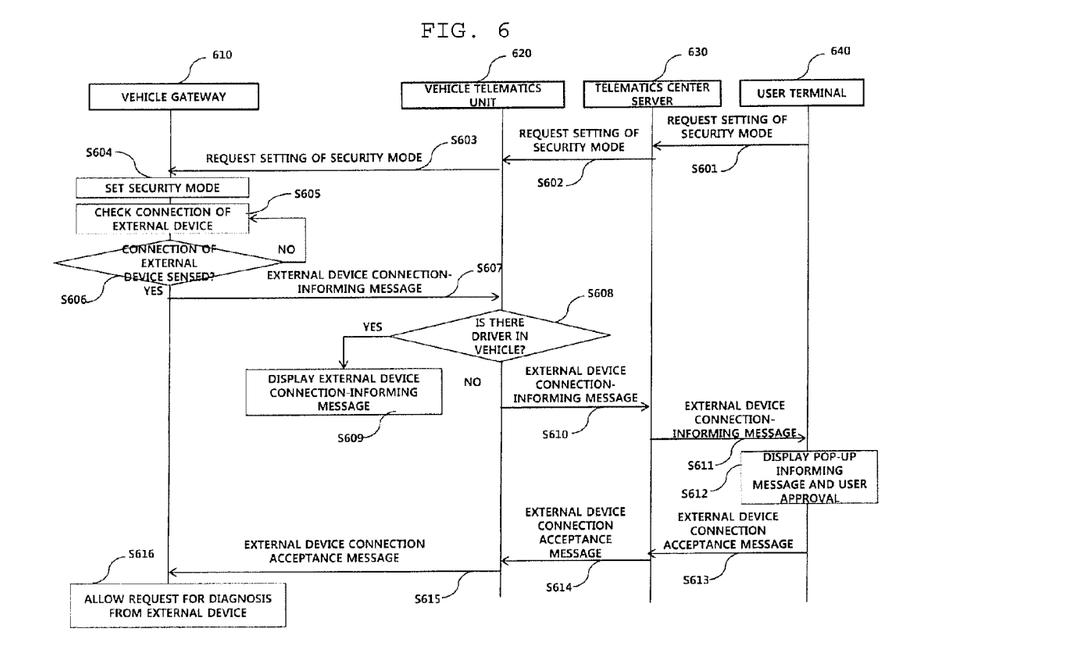
FIG. 6 is a flowchart explaining a vehicle security service provision method according to another embodiment of the present invention.

FIG. 6 is a flowchart explaining a vehicle security service provision method according to another embodiment of the present invention.

Referring to FIG. 6, a user terminal 640 transmits a security mode setting request signal to a vehicle telematics unit 620 via a telematics center server 630 (S601 and S602).

Then, the vehicle telematics unit 620 transfers the received security mode setting request signal to a vehicle gateway 610 via an in-vehicle communication network (S603).

In response to the received security mode setting request signal, the vehicle gateway 610 sets a security mode. The vehicle gateway 610 subsequently checks whether or not an external device has been connected to an OBD connector (S604 and S605). In this case, connection of an external device may be sensed based on current flow on the OBD connector through the input terminal of the vehicle gateway 610 or a diagnosis request message received through the OBD connector.

Upon sensing connection of an external device, the vehicle gateway 610 transmits an external device connection-informing message to the vehicle telematics unit 620 (S606 and S607).

Upon receiving the external device connection-informing message, the vehicle telematics unit 620 checks whether or not there is a driver in the vehicle (S608). It may be possible to check whether or not there is a driver in the vehicle, by sensing a smart key carried by the driver. In accordance with another embodiment of the present invention, it may be possible to check whether or not there is a driver in the vehicle, through a Bluetooth pairing procedure automatically executed between a vehicle head unit and a user's smartphone in an ON state of an adaptive cruise control (ACC) in the vehicle or a similar state thereto. That is, when the vehicle head unit is normally Bluetooth-paired with the driver's smartphone, or the driver's smartphone is sensed during a Bluetooth pairing procedure, it may be determined that there is a driver in the vehicle.

When it is determined that there is a driver in the vehicle, the vehicle telematics unit 620 may output, through a display screen or a speaker, a predetermined informing message to inform that an external device has been connected (S609).

When it is determined at step 608 that there is no driver in the vehicle, the vehicle telematics unit 620 may transfer the external device connection-informing message to the user terminal 640 via the telematics center server 630 (S610 and S611).

The user terminal 640 creates a predetermined pop-up informing message for user approval for connection of an external device, and displays the created pop-up informing message on a display screen. In this case, the user may determine approval or rejection by selecting a desired one of buttons displayed on the pop-up informing message (S612). The buttons include an acceptance button and a rejection button.

When connection of an external device is approved by the user, the user terminal 640 transmits an external device connection acceptance message to the vehicle telematics unit 620 via the telematics center server 630 (S613 and S614).

The vehicle telematics unit 620 transfers the external device connection acceptance message to the vehicle gateway 610 via an in-vehicle communication network (S615). Upon subsequently receiving a diagnosis request signal from the external device, the vehicle gateway 610 routes to an associated ECU, and then transfers a diagnosis response signal received from the associated ECU and, as such, may accept a request for diagnosis from the external device (S616).

Although the vehicle gate way 610 has been described as setting the security mode based on the security mode setting request signal received from the user terminal 640 in the embodiment of FIG. 6, this is only illustrative. In accordance with another embodiment of the present invention, the security mode may be set by selecting a predetermined menu on the vehicle telematics unit 620, or the driver may set the security mode by pressing a security mode setting button provided at the vehicle handle or one side of the room mirror.

The methods and apparatuses according to the present invention have the following effects.

First, the present invention provides a vehicle security service provision method and system and, as such, has advantages.

Second, the present invention provides a vehicle security service provision method and system capable of sensing of current variation on an OBD connection terminal in a vehicle when connection of an external device is determined, and transmitting a connection approval request message to a user's mobile terminal and, as such, has advantages.

Third, the present invention provides a vehicle security service provision method and system capable of monitoring control signals received by and transmitted from a high-speed CAN in real time, to check whether or not an external device is connected, and informing a user of results of the checking and, as such has advantages.

Fourth, the present invention provides a vehicle security service provision method and system capable of remotely checking in real time whether or not a vehicle is hacked and, as such, has advantages.

It will be appreciated by persons skilled in the art that the effects that can be achieved through the present invention are not limited to what has been particularly described hereinabove and other advantages of the present invention will be more clearly understood from the above detailed description.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A vehicle security service provision method in a vehicle gateway having an input port for connection of an external device, comprising steps of:
    determining, in the vehicle gateway, whether or not the external device has been connected based on a voltage variation on an on-board diagnostics (OBD) connector connected to the input port of the vehicle gateway under a condition that an eighth pin of the OBD connector is connected to the input port of the vehicle gateway;
    transmitting, from the vehicle gateway, an external device connection-informing message to a vehicle telematics computer through an in-vehicle communication network upon determination that the external device has been connected;
    receiving, in the vehicle gateway, an external device connection acceptance message from the vehicle telematics computer; and
    processing, in the vehicle gateway, a diagnosis request message received from the external device in response to the received external device connection acceptance message,
    wherein, when sixteenth and eighth pins provided at a connection terminal of the external device are shorted, the external device is determined to be connected to the vehicle gateway via the OBD connector.

2. The vehicle security service provision method according to claim 1, wherein the voltage variation on the input port is sensed when power is supplied to a sixteenth pin of the OBD connector such that the power supplied to the sixteenth pin of the OBD connector is transferred to the eighth pin of the OBD connector in accordance with the short circuit.

3. The vehicle security service provision method according to claim 1, wherein the external device connection-informing message is transferred to a designated user terminal by the vehicle telematics computer.

4. The vehicle security service provision method according to claim 3, wherein the external device connection acceptance message is created by the user terminal, and is transferred to the vehicle gateway via the vehicle telematics computer.

5. The vehicle security service provision method according to claim 1, further comprising a step of:
    receiving an external device connection rejection message from the vehicle telematics computer, and discarding the diagnosis request message received from the external device in response to the external device connection rejection message.

6. The vehicle security service provision method according to claim 1, further comprising a step of:
    receiving a security setting request signal from the vehicle telematics computer, and executing the determining whether or not the external device has been connected, in response to the security setting request signal.

7. The vehicle security service provision method according to claim 6, wherein the security setting request signal is generated in accordance with at least one of inputting of a predetermined button provided at a handle of the vehicle, inputting of a predetermined button provided at one side of a room mirror in the vehicle, selection of a predetermined menu on a display screen of the vehicle telematics computer, and selection of a predetermined menu on a display screen of a designated user terminal.

8. The vehicle security service provision method according to claim 1, wherein, when the diagnosis request message is received through the OBD connector, it is determined that the external device has been connected, and a control operation to prevent routing of the diagnosis request message is executed until the external device connection acceptance message is received.

9. A non-transitory computer-readable recording medium recorded with a program to execute the method according to claim 1.

10. A vehicle gateway for providing a vehicle security service for an external device in connection with a vehicle telematics computer, the vehicle gateway comprising:
    an input port to connect an on-board diagnostics (OBD) connector; and
    an in-vehicle communication port to connect the vehicle telematics computer,
    wherein the vehicle gateway determines whether or not the external device has been connected based on a voltage variation on the OBD connector connected to the input port of the vehicle gateway under a condition that an eighth pin of the OBD connector is connected to the input port of the vehicle gateway, transmits an external device connection-informing message to the vehicle telematics computer through an in-vehicle communication port upon determination that the external device has been connected, receives an external device connection acceptance message from the vehicle telematics computer, and processes a diagnosis request message received from the external device in response to the received external device connection acceptance message, and
    wherein when sixteenth and eighth pins provided at a connection terminal of the external device are shorted, the external device is determined to be connected to the vehicle gateway via the OBD connector.

11. The vehicle gateway according to claim 10, wherein the voltage variation on the input port is sensed when power is supplied to a sixteenth pin of the OBD connector such that the power supplied to the sixteenth pin is transferred to the eighth pin of the OBD connector in accordance with the short circuit.

12. The vehicle gateway according to claim 10, wherein the vehicle gateway receives an external device connection rejection message from the vehicle telematics computer, and discards the diagnosis request message received from the external device in response to the external device connection rejection message.

13. The vehicle gateway according to claim 10, wherein the vehicle gateway receives a security setting request signal from the vehicle telematics computer, and
    wherein the vehicle gateway checks whether or not an external device has been connected, in response to the security setting request signal.

14. The vehicle gateway according to claim 10, wherein the vehicle gateway is connected to an on-board diagnostics (OBD) connector for connection of the external device and, when the diagnosis request message is received through the OBD connector, the vehicle gateway determines that the external device has been connected, and executes a control operation to prevent routing of the diagnosis request message until the external device connection acceptance message is received.

* * * * *